US008538905B2

(12) United States Patent
Proctor et al.

(10) Patent No.: US 8,538,905 B2
(45) Date of Patent: Sep. 17, 2013

(54) LAZILY ENABLED TRUTH MAINTENANCE IN RULE ENGINES

(75) Inventors: Mark Proctor, London (GB); Edson Tirelli, Montreal (CA)

(73) Assignee: Red Hat, Inc., Raleigh, NC (US)

( * ) Notice: Subject to any disclaimer, the term of this patent is extended or adjusted under 35 U.S.C. 154(b) by 371 days.

(21) Appl. No.: 12/959,192

(22) Filed: Dec. 2, 2010

(65) Prior Publication Data

US 2012/0143809 A1    Jun. 7, 2012

(51) Int. Cl.
  *G06N 5/02*    (2006.01)
  *G06F 17/00*   (2006.01)

(52) U.S. Cl.
  USPC .............................................. 706/47; 706/61

(58) Field of Classification Search
  None
  See application file for complete search history.

(56) References Cited

U.S. PATENT DOCUMENTS

| 2008/0147584 A1 * | 6/2008 | Buss ............................... 706/47 |
| 2008/0301079 A1 * | 12/2008 | Proctor et al. ................. 706/47 |
| 2009/0063382 A1 * | 3/2009 | Proctor et al. ................. 706/47 |
| 2010/0057647 A1 * | 3/2010 | Davis et al. .................... 706/12 |
| 2010/0205205 A1 * | 8/2010 | Hamel ........................... 707/769 |

OTHER PUBLICATIONS

Everett, Scaling up Logic-based Truth Maintenance Systems via Fact Garbage Collection, 1996.*
JBoss Cache, ConcurrentReferenceHashMap, 2008.*
Sorensen, Improved JNI Memory Management Using Allocations from the Java Heap, 2007.*

* cited by examiner

*Primary Examiner* — Jeffrey A Gaffin
*Assistant Examiner* — Mikayla Chubb
(74) *Attorney, Agent, or Firm* — Lowenstein Sandler LLP

(57) ABSTRACT

Some embodiments of a method to lazily enable truth maintenance in a rule engine have been presented. A rule engine can enable truth maintenance on an object type basis. In response to a working memory action involving a particular object type, the rule engine may check a truth maintenance parameter of the object type involved to determine if truth maintenance for the object type has to be enabled. If so, the rule engine may enable truth maintenance for the object type.

18 Claims, 4 Drawing Sheets

LAZILY ENABLED TRUTH MAINTENANCE IN RULE ENGINES

TECHNICAL FIELD

Embodiments of the present invention relate to artificial intelligence, and more specifically to rule engines.

BACKGROUND

The development and application of rule engines is one branch of Artificial Intelligence (A.I.), which is a very broad research area that focuses on "making computers think like people." Broadly speaking, a rule engine processes information by applying rules to data objects (also known as facts; or simply referred to as data or objects). A rule is a logical construct for describing the operations, definitions, conditions, and/or constraints that apply to some predetermined data to achieve a goal. Various types of rule engines have been developed to evaluate and process rules.

Conventionally, a rule engine includes a working memory, which is an object for holding references to data to be evaluated against the rules. Broadly speaking, insertion of a fact is the act of telling the working memory about the fact. Note that insertion may also be referred to assertion. In other words, "insert" and "assert" may be used interchangeably in the context of rule engines. A working memory may operate in two assertion modes, namely, equality and identity. Typically, identity is the default mode. Identity means that the working memory uses an IdentityHashMap to store all asserted objects. Note that new instance assertions typically result in the return of a new FactHandle. If an instance is asserted twice, then it returns the previous fact handle, i.e., it ignores the second insertion for the same fact. On the other hand, equality means that the working memory uses a HashMap to store all asserted objects. New instance assertions will only return a new FactHandle if no equal instances have been asserted.

The rule engine typically implements a network to process rules and data objects inserted into the working memory. A network may include many different types of nodes, including, for example, object-type nodes, alpha nodes, left-input-adapter nodes, accumulate nodes, eval nodes, join nodes, not nodes, and terminal nodes, etc. Some conventional rule engines build Rete networks, and hence, are referred to as Rete rule engines.

Typically, data objects enter a network at the root node, from which they are propagated to any matching object-type nodes. From an object-type node, a data object is propagated to either an alpha node (if there is a literal constraint), a left-input-adapter node (if the data object is the left most object type for the rule), or a beta node (such as a join node). A set of facts matching a rule can be referred to as a tuple, which can be propagated from one node to another node.

A beta node has two inputs, unlike one-input nodes, such as object-type nodes and alpha nodes. A beta node can receive tuples in its left-input and data objects, or simply referred to as objects, in its right-input. Join nodes, not nodes, and exist nodes are some examples of beta nodes. All nodes may have one or more memories to store a reference to the data objects and tuples propagated to them, if any. For example, a beta node can have a left memory and a right memory associated with its left input and right input, respectively. The left-input-adapter node creates a tuple with a single data object and propagates the tuple created to the left input of the first beta node connected to the left-input-adapter node, where the tuple is placed in the left memory of the beta node and then join attempts are made with all the objects in the right memory of the beta node.

When another data object enters the right input of the join node, the data object is placed in the right memory of the join node and join attempts are made with all the tuples in the left memory of the join node. The tuples placed in the left memory of the join node are partially matched. If a join attempt is successful, the data object is added to the tuple, which is then propagated to the left input of the next node in the network. Such evaluation and propagation continue through other nodes down the network, if any, until the tuple reaches the terminal node. When the tuple reaches the terminal node, the tuple is fully matched. At the terminal node, an activation is created from the fully matched tuple and the corresponding rule. The activation is placed onto an agenda of the rule engine for potential firing or potential execution.

BRIEF DESCRIPTION OF THE DRAWINGS

The present invention is illustrated by way of example, and not by way of limitation, in the figures of the accompanying drawings and in which.

DETAILED DESCRIPTION

Described herein are some embodiments of a method and an apparatus to lazily enable truth maintenance in a rule engine. In general, a rule engine processes data by evaluating data against a set of rules. Typically, the set of rules are in a rule file, which can be compiled and executed by a rule engine to evaluate data against the rules. The data includes data objects (or simply referred to as objects) asserted in a working memory of the rule engine, which can also be referred to as facts. In the following discussion, facts and objects are used interchangeably.

In some embodiments, the rule engine maintains a configuration object for each object type of facts. The configuration setting for truth maintenance for each object type is moved to this configuration object, thus, allowing truth maintenance to be lazily enabled on demand. Broadly speaking, to lazily enable truth maintenance is to automatically enable truth maintenance, without requiring user action or interference, for an object type when truth maintenance is needed. Each time there is a working memory action on a fact, such as insertion of a fact or retraction of a fact, the rule engine retrieves the configuration object of the object type of the fact and checks the configuration setting for truth maintenance in the configuration object. Based on the configuration setting and the working memory action, the rule engine can determine whether to enable or disable truth maintenance for the object type. More details of some embodiments of a method and an apparatus to lazily enable truth maintenance in a rule engine are described below.

Figure 1:
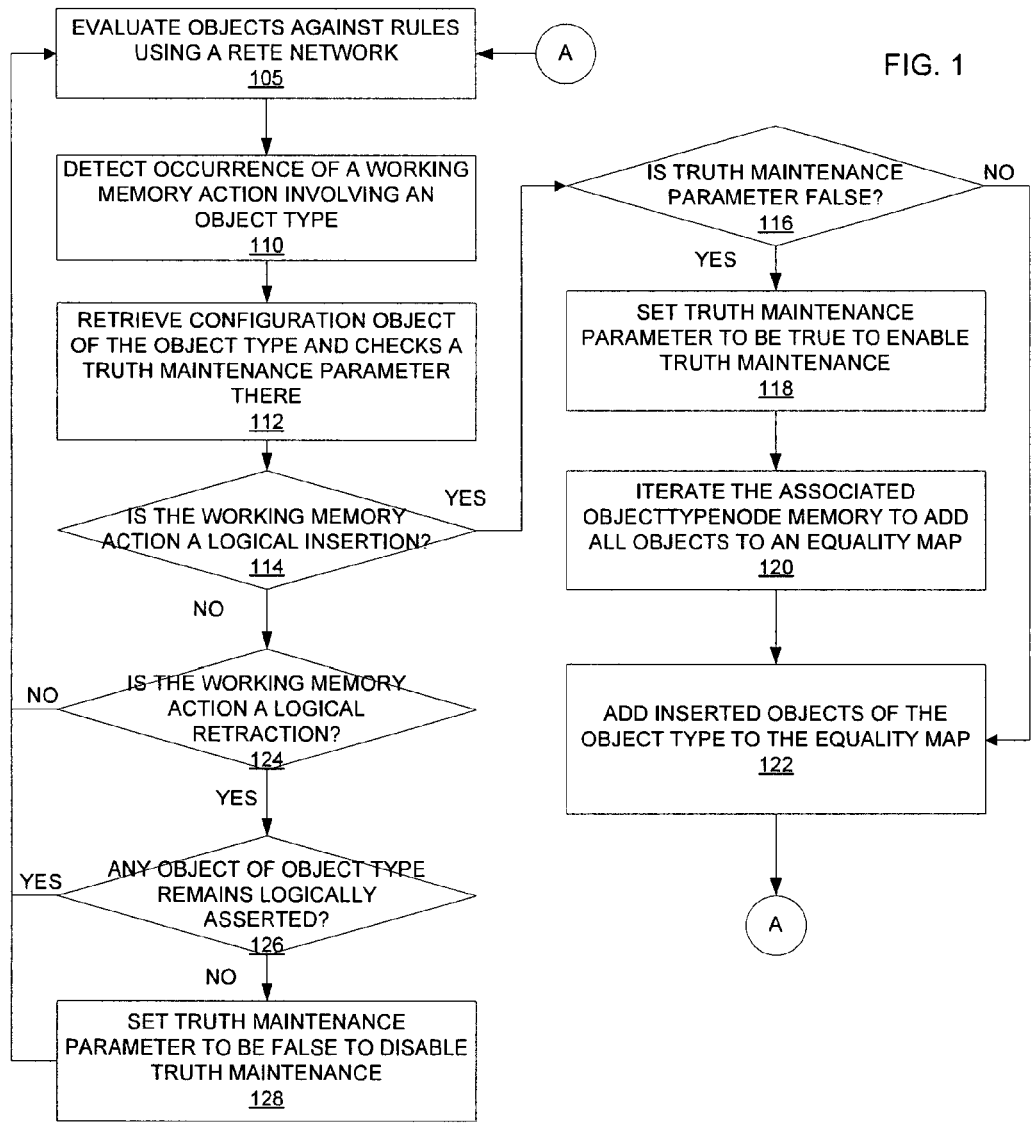
FIG. 1 illustrates one embodiment of a method to lazily enable truth maintenance in a rule engine.

FIG. 1 illustrates one embodiment of a method to lazily enable truth maintenance in a rule engine. At least part of the method can be performed by the rule engine running on a computing system. Initially, the rule engine evaluates objects or facts against rules using a network (e.g., a Rete network)

(processing block 105). A user of the rule engine may provide the rules. For example, in a business application, the rules include business rules pertaining to business transactions (e.g., medical insurance claim processing, mortgage application, etc.). Further, the network is built based on the rules. In some embodiments, this network includes one or more object type nodes, each associated with a specific object type. Further, the rule engine may detect occurrence of a working memory action involving a particular object type (processing block 110). The working memory action is an action performed on a fact held in the working memory, such as an insertion of a fact, a retraction of a fact, etc. As mentioned above, each fact has an object type (e.g., an integer, a string a characters, etc.). The rule engine retrieves a configuration object of the object type and checks a truth maintenance parameter there (processing block 112). The configuration object of the object type stores parameters for configuring the rule engine with respect to the object type. Specifically, the truth maintenance parameter can be set to enable or disable truth maintenance for a corresponding object type. In some embodiments, the truth maintenance parameter is a Boolean value. Alternatively, the Boolean parameter is an integer.

In some embodiments, the rule engine determines if the working memory action is a logical insertion of an object (processing block 114). If so, the rule engine further checks if the truth maintenance parameter is false (processing block 116). If the truth maintenance parameter is false, then the rule engine sets the truth maintenance parameter to be true to enable truth maintenance (processing block 118), iterates the associated object type node memory to add all objects in the object type node memory to an equality map (processing block 120), and adds inserted objects of the object type to the equality map (processing block 122). Otherwise, if the truth maintenance parameter is true, then the rule engine simply adds inserted objects of the object type to the equality map (processing block 122). From block 122, the rule engine returns to block 105 to repeat the above operations as the rule engine continues evaluating facts against rules.

At block 114, if the rule engine determines that the working memory action is not a logical insertion of an object, then the rule engine checks if the working memory action is a logical retraction of an object (processing block 124). If so, the rule engine checks if there is any other objects of the object type of this object that remains logically asserted (processing block 126). If there is at least one object of the object type still logically asserted, then the rule engine returns to block 105 to repeat the above operations as the rule engine continues evaluating facts against rules, thus, leaving truth maintenance of the object type enabled. Otherwise, if there are no more objects of the object type logically asserted, then the rule engine sets the truth maintenance parameter of the object type to be false to disable truth maintenance (processing block 128), and then the rule engine returns to block 105 to repeat the above operations as the rule engine continues evaluating facts against rules.

If the rule engine determines at block 124 that the working memory action is not a retraction, then the rule engine returns to block 105 to repeat the above operations as the rule engine continues evaluating facts against rules, leaving the status of truth maintenance of the object type unchanged.

In some embodiments, the truth maintenance parameter of each object type is set to false by default. With truth maintenance being lazily enabled per object type, the rule engine avoids using the equality hashmap that would be maintained for all inserted objects. In other words, the hashmap is no longer used for all inserted objects, but for only those that match an object type that currently has truth maintenance enabled, saving some memory. A further advantage of the above approach is that truth maintenance enablement is more fine grained, and when enabled, truth maintenance only impacts a specific object type (i.e., it does not impact other object types).

In some embodiments, the rule engine usable to perform the above method comprises processing logic implemented with hardware (e.g., circuitry, dedicated logic, programmable logic, microcode, etc.), software (such as instructions run on a processing device), firmware, or a combination thereof. For example, the rule engine may be executable on a processing device running in a computing machine (e.g., a personal computer (PC), a server, a laptop computer, a tablet computer, a personal digital assistant (PDA), a smart phone, etc.). The processing device can include one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device may also be one or more special-purpose processing devices such as an application specific integrated circuit (ASIC), a field programmable gate array (FPGA), a digital signal processor (DSP), network processor, or the like. The computing machine may further include machine-readable storage medium (a.k.a. computer-readable storage medium) coupled to the processing device, to store data (e.g., the node memories) and/or instructions. The machine-readable storage medium may include one or more of a read-only memory (ROM), a flash memory, a dynamic random access memory (DRAM), a static random access memory (SRAM), etc. In addition, the computing machine may include other components, such as a network interface device, a video display unit (e.g., a liquid crystal display (LCD), a touch screen, a cathode ray tube (CRT), etc.), an alphanumeric input device (e.g., a keyboard, a touch screen, etc.), a cursor control device (e.g., a mouse, a joystick, a touch screen, etc.), a signal generation device (e.g., a speaker), etc.

Figure 2:
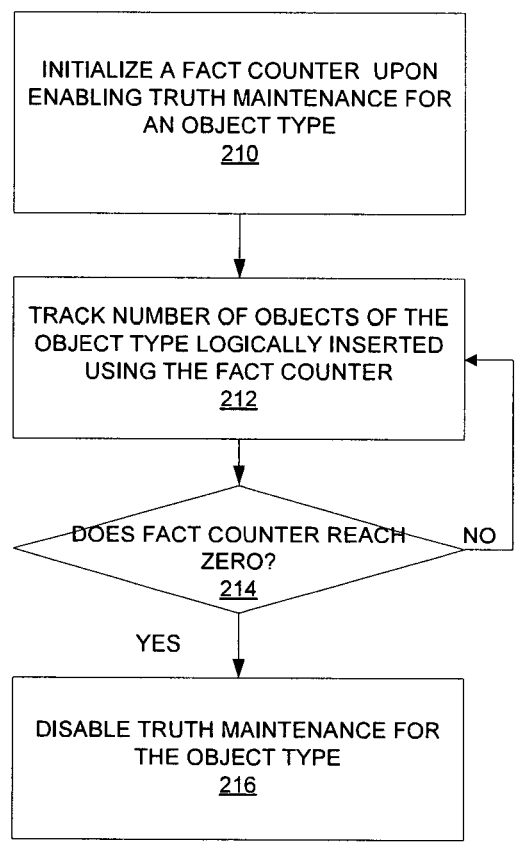
FIG. 2 illustrates an alternate embodiment of a method to lazily enable truth maintenance in a rule engine.

FIG. 2 illustrates an alternate embodiment of a method to lazily enable truth maintenance in a rule engine. At least part of the method can be performed by the rule engine running on a computing system, such as the rule engine discussed above. Initially, the rule engine initializes a fact counter in an object type's configuration object upon enabling truth maintenance for the object type (processing block 210). The fact counter can be implemented using an integer counter using software, hardware, or a combination of both. The rule engine tracks the number of objects of the object type being logically inserted into a working memory of the rule engine using the fact counter (processing block 212). For example, each time an object of the object type is logically inserted into the working memory, the rule engine may increment the fact counter by one (1). Likewise, each time an object of the object type is logically retracted from the working memory, the rule engine may decrement the fact counter by 1. Thus, the value of the fact counter represents the number of objects of the object type that is currently logically asserted in the working memory.

In some embodiments, the rule engine checks if the fact counter reaches zero (processing block 214). If the fact counter reaches zero, then it indicates that there is no more facts of the object type being logically justified in the working memory currently, and hence, there is no need to continue enabling truth maintenance for the object type. Therefore, the rule engine disables truth maintenance for the object type (processing block 216). For example, the rule engine may set a truth maintenance parameter in a configuration object of the object type to a predetermined value (e.g., false) in order to disable truth maintenance for the object type. Otherwise, if the fact counter has not reached zero, then it indicates that there is at least one fact of the object type being asserted currently in the working memory, and hence, truth maintenance is still needed. Therefore, the rule engine let truth maintenance remain enabled for the object type and returns to block 212 to continue tracking the number of objects of the object type using the fact counter.

Figure 3:
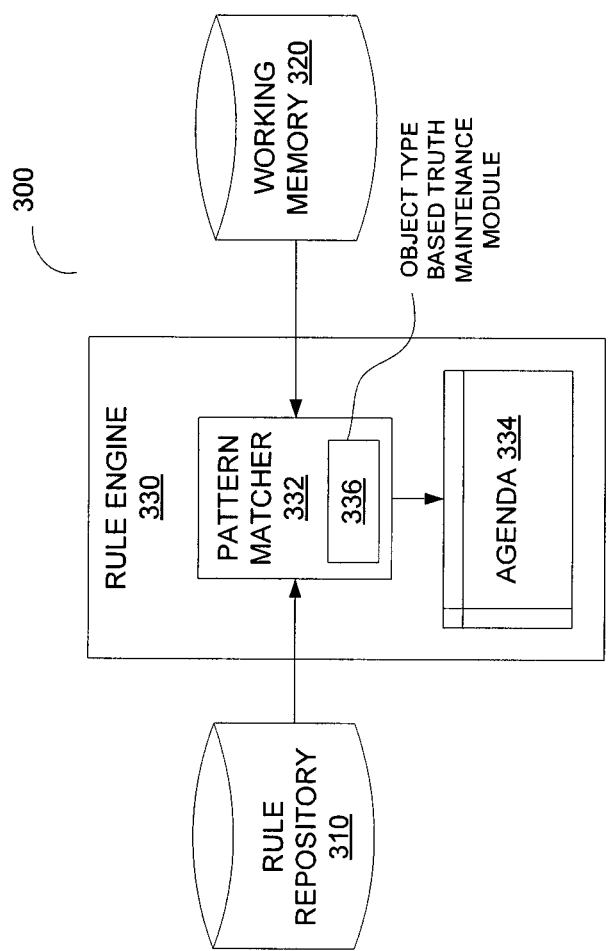
FIG. 3 shows one embodiment of a rule engine usable with some embodiments of the present invention.

FIG. 3 illustrates one embodiment of a Rete network and one embodiment of an object type's configuration object. Note that the Rete network 300 and the object type's configuration object 340 shown in FIG. 3 are merely some examples used to illustrate the concept of lazily enabling truth maintenance in a rule engine. The techniques discussed herein can be applicable to other networks and/or object types.

The following example is discussed in details to further illustrate the above concept. In the current example, a rule is defined as follows:

```
rule "sound the fire alarm"
when
    $room : Room( isOnFire == true )
then
    insertLogical( new FireAlarm( $room ) );
end
```

The above rule says that if there is a room on fire, then the fire alarm should be sounded, i.e., logically inserted. When a FireAlarm is logically inserted by the rule above, truth maintenance may be automatically enabled on the FireAlarm object type node, and may start tracking all FireAlarms. If multiple rooms are on fire, then appropriate FireAlarms can be raised. As firefighters extinguish the fire in each room, the corresponding FireAlarm is logically retracted by the rule engine. When no more rooms are on fire, i.e., there are no more FireAlarms logically inserted, the truth maintenance system for FireAlarm object type is disabled.

Note that in the above example, room facts are never logically asserted, and hence, truth maintenance is not enabled for room facts, thus, saving memory space and improving performance of the rule engine. Further, other rules might assert FireAlarms for other reasons, The object type node can track all FireAlarms for all rules and enable and/or disable truth maintenance automatically and transparently for all rules that justify or that depend on the logically inserted facts.

FIG. 3 shows one embodiment of a rule engine usable to implement some embodiments of the current invention. In some embodiments, a rule engine 330 is operatively coupled to a rule repository 310 and a working memory 320. The rule repository 310 is a logical space that stores a rule set having a number of rules. The rule repository 310 may also be referred to as a production memory. The working memory 320 is a logical space that stores data objects (also referred to as facts) that have been asserted.

In some embodiments, the rule engine 330 includes a pattern matcher 332 and an agenda 334. The pattern matcher 332 generates network (such as a Rete network) to evaluate the rules from the rule repository 310 against the data objects from the working memory 320. One or more of the nodes within the network are multiple-input nodes, such as a beta node. An object type based truth maintenance module 336 within the pattern matcher 332 maintains a truth maintenance parameter in each object type's configuration object to enable or disable truth maintenance for a respective object type. Details of some examples of enabling and/or disabling truth maintenance per object type in a rule engine have been described above.

As the data objects propagating through the network, the pattern matcher 332 evaluates the data objects against the rules. Fully matched rules result in activations, which are placed into the agenda 334. The rule engine 330 may iterate through the agenda 334 to execute or fire the activations sequentially. Alternatively, the rule engine 330 may execute or fire the activations in the agenda 334 randomly.

Figure 4:
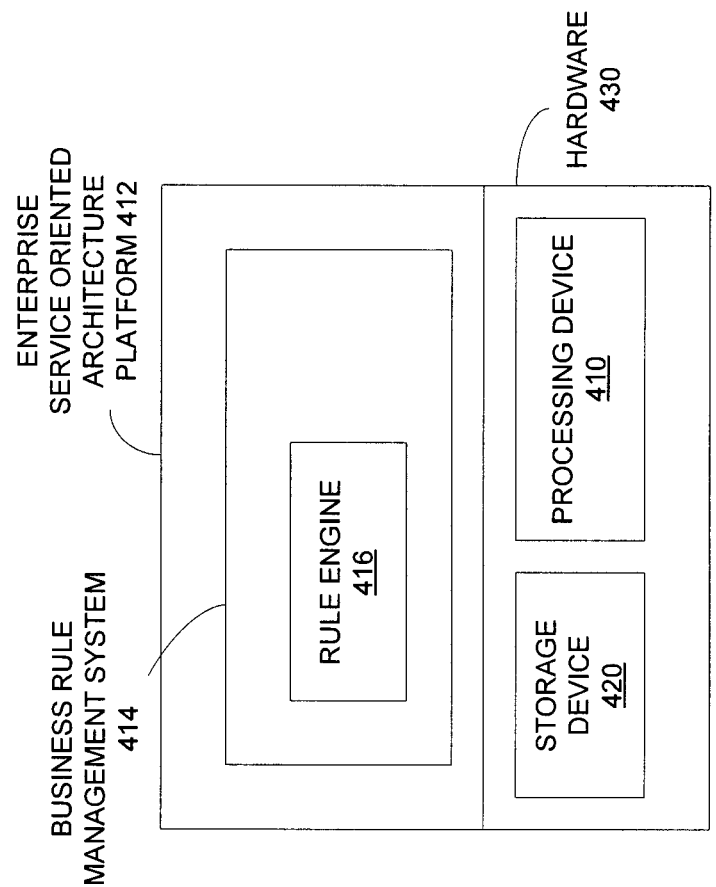
FIG. 4 shows one embodiment of an enterprise service oriented architecture (SOA) platform.

FIG. 4 shows one embodiment of enterprise service oriented architecture (SOA) platform usable in some embodiments of the invention. In general, the enterprise SOA platform 412 can integrate applications, services, transactions, and business components into automated business processes. An enterprise can use the enterprise SOA platform 412 to integrate services, handle business events, and automate business processes more efficiently, linking information technology resources, data, services, and applications across the enterprise. For example, a bank may deploy the enterprise SOA platform 412 to integrate various banking services (e.g., mortgage, personal banking, etc.), handle business events (e.g., opening and closing of a bank account, overdraft, etc.), and automate business processes (e.g., direct deposit, payment of bills, etc.).

The enterprise SOA platform 412 may include various middleware components, such as a business rule management system (BRMS) 414, which further includes a rule engine 416. One embodiment of the rule engine 416 is illustrated in FIG. 3. The rule engine 416 may be operable to evaluate data against rules (e.g., business rules). In some embodiments, the rule engine 416 can lazily enable truth maintenance. In other words, the rule engine 416 can automatically enable truth maintenance, without requiring user action or interference, for an object type when truth maintenance is needed. Some embodiments of the methods to lazily enable truth maintenance in a rule engine have been discussed above.

The enterprise SOA platform 412 is executable on hardware 430, which may include a processing device 410. The processing device 410 can include one or more general purpose processing devices, such as a microprocessor, a central processing unit, or the like. More particularly, the processing device 410 may be complex instruction set computing (CISC) microprocessor, reduced instruction set computing (RISC) microprocessor, very long instruction word (VLIW) microprocessor, or processing device implementing other instruction sets, or processing devices implementing a combination of instruction sets. The processing device 410 may also be one or more special-purpose processing devices such as an application specific integrated circuit (ASIC), a field programmable gate array (FPGA), a digital signal processor (DSP), network processor, or the like. The hardware 430 further includes a storage device 420.

In some embodiments, the storage device 420 may include one or more computer-accessible storage media (also known as computer-readable storage media). Some examples of computer-accessible storage media include any type of disk, such as optical disks, CD-ROMs, and magnetic-optical disks; read-only memories (ROMs); random access memories (RAMs); EPROMs; EEPROMs; magnetic or optical cards; or any type of media suitable for storing electronic instructions and/or data. The storage device 420 can store instructions executable by the processing device 410, as well as data usable by the processing device 410.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "enabling" or "disabling" or "retracting" or "tracking" or "recording" or "iterating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but is not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required operations. The required structure for a variety of these systems will appear from the description above. In addition, the present invention is not described with reference to any particular programming language. It will be appreciated that a variety of programming languages may be used to implement the teachings of the invention as described herein.

Thus, some embodiments of a method and an apparatus to lazily enable truth maintenance in a rule engine have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method comprising:
   allowing truth maintenance to be enabled on an object type basis;
   in response to an action on an object in a working memory checking a truth maintenance parameter of an object type of the object to determine that truth maintenance for the object type has to be enabled, wherein the action is a logical assertion of a first fact in the working memory; and
   enabling, by a rule engine executed by a processing device, truth maintenance for the object type in response to the determination that truth maintenance for the object type has to be enabled.

2. The method of claim 1, further comprising:
   using a Rete network to evaluate facts in the working memory against a plurality of rules, wherein the Rete network includes an object type node associated with the object type; and
   iterating through an object type node memory of the object type node to add all objects in the object type node memory into an equality map in response to the determination that truth maintenance for the object type has to be enabled.

3. The method of claim 1, wherein the truth maintenance parameter of the object type comprises a Boolean value.

4. The method of claim 1, further comprising:
   tracking logical retraction and logical assertion of objects of the object type using a counter associated with the object type; and
   in response to the counter reaching zero, disabling truth maintenance for the object type.

5. The method of claim 1, further comprising:
   retaining objects of the object type in an equality map in response to truth maintenance of the object type being enabled.

6. The method of claim 1, further comprising:
   in response to disabling truth maintenance of the object type, recording an identification of a fact counter associated with the object type; and
   in response to a logical retraction of a second fact of the object type, checking the identification of the fact counter to determine that the second fact was logically asserted prior to disabling truth maintenance; and
   logically retracting the second fact from an equality map in response to the determination that the second fact was logically asserted prior to disabling truth maintenance.

7. An apparatus comprising:
   a first storage device to store a working memory; and
   a processing device coupled to the first storage device, to execute a rule engine, in which truth maintenance is enabled on an object type basis, wherein, in response to an action on an object in the working memory, the rule engine checks a truth maintenance parameter of an object type of the object to determine that truth maintenance for the object type has to be enabled, and in response, the rule engine enables truth maintenance for the object type, wherein the action is a logical assertion of a first fact in the working memory.

8. The apparatus of claim 7, wherein the rule engine uses a Rete network to evaluate facts in the working memory against a plurality of rules, wherein the Rete network includes an object type node associated with the object type, and the rule engine further iterates through an object type node memory of the object type node to add all objects in the object type node memory into an equality map in response to the determination that truth maintenance for the object type has to be enabled.

9. The apparatus of claim 7, wherein the truth maintenance parameter of the object type comprises a Boolean value.

10. The apparatus of claim 7, further comprising:
a counter coupled to the storage device to track logical retraction and logical assertion of objects of the object type, wherein the rule engine disables truth maintenance for the object type in response to the counter reaching zero.

11. The apparatus of claim 7, wherein the rule engine retains objects of the object type in an equality map in response to truth maintenance of the object type being enabled.

12. The apparatus of claim 7, wherein the rule engine records an identification of a fact counter associated with the object type in response to truth maintenance of the object type being disabled, checks the identification of the fact counter to determine that a second fact of the object type was logically asserted prior to disabling truth maintenance in response to a logical retraction of the second fact, and logically retracts the second fact from an equality map in response to the determination that the second fact was logically asserted prior to disabling of the truth maintenance.

13. A non-transitory computer-readable storage medium having instructions stored therein which, when executed by a processing device, cause the processing device to perform operations comprising:
allowing truth maintenance to be enabled on an object type basis;
in response to an action on an object in a working memory checking a truth maintenance parameter of an object type of the object to determine that truth maintenance for the object type has to be enabled;
enabling, by the rule engine executed by the processing device, truth maintenance for the object type in response to the determination that truth maintenance for the object type has to be enabled; and
retaining objects of the object type in an equality map in response to truth maintenance of the object type being enabled.

14. The computer-readable storage medium of claim 13, wherein the operations further comprise:
using a Rete network to evaluate facts in the working memory against a plurality of rules, wherein the Rete network includes an object type node associated with the object type; and
iterating through an object type node memory of the object type node to add all objects in the object type node memory into the equality map in response to the determination that truth maintenance for the object type has to be enabled.

15. The computer-readable storage medium of claim 13, wherein the truth maintenance parameter of the object type comprises a Boolean value.

16. The computer-readable storage medium of claim 13, wherein the operations further comprise:
tracking logical retraction and logical assertion of objects of the object type using a counter associated with the object type; and
in response to the counter reaching zero, disabling truth maintenance for the object type.

17. The computer-readable storage medium of claim 13, wherein the action is a logical assertion of a fact in the working memory.

18. The computer-readable storage medium of claim 13, wherein the operations further comprise:
in response to disabling truth maintenance of the object type, recording an identification of a fact counter associated with the object type; and
in response to a logical retraction of a fact of the object type, checking the identification of the fact counter to determine that the fact was logically asserted prior to disabling truth maintenance; and
logically retracting the fact from the equality map in response to the determination that the fact was logically asserted prior to disabling truth maintenance.

\* \* \* \* \*